No. 706,644. Patented Aug. 12, 1902.
E. C. EDWARDS.
ELEVATOR STOP.
(Application filed May 10, 1902.)
(No Model.)
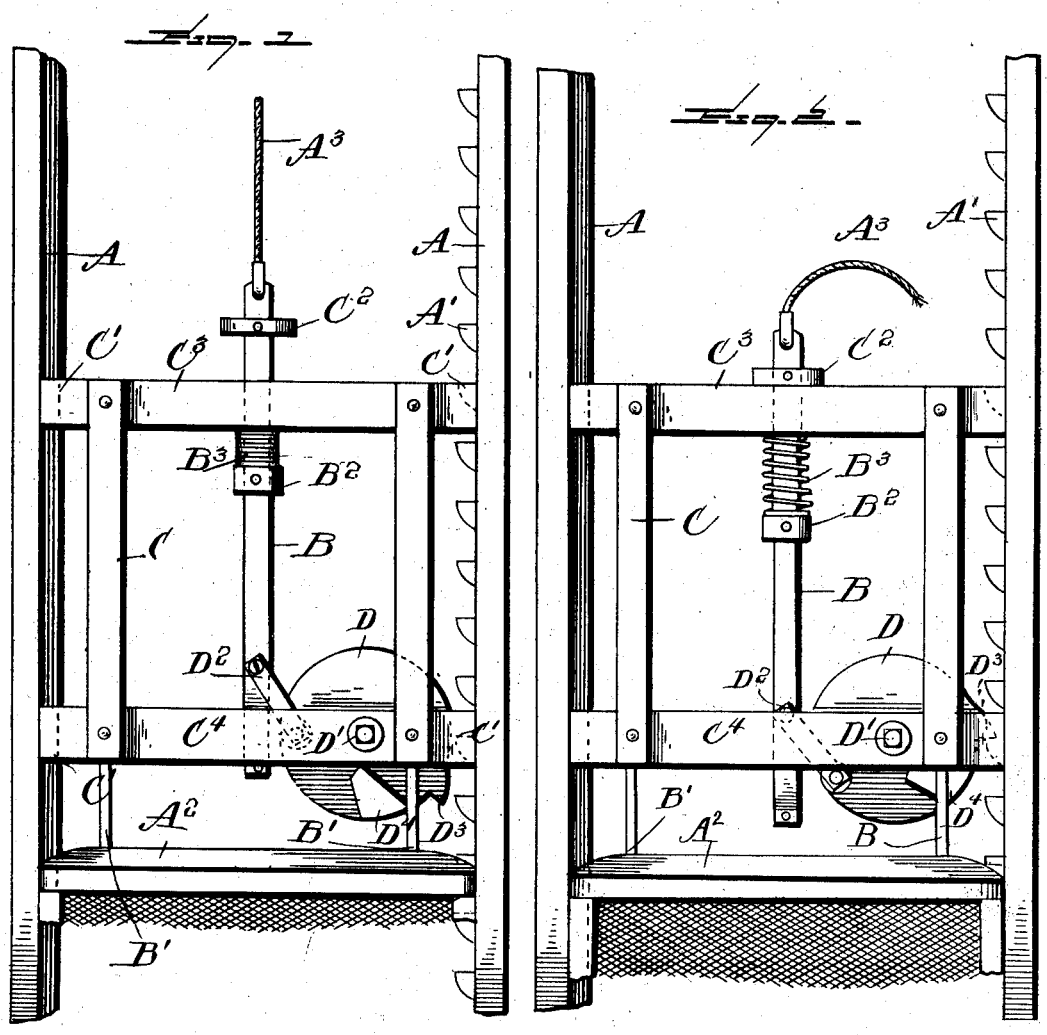
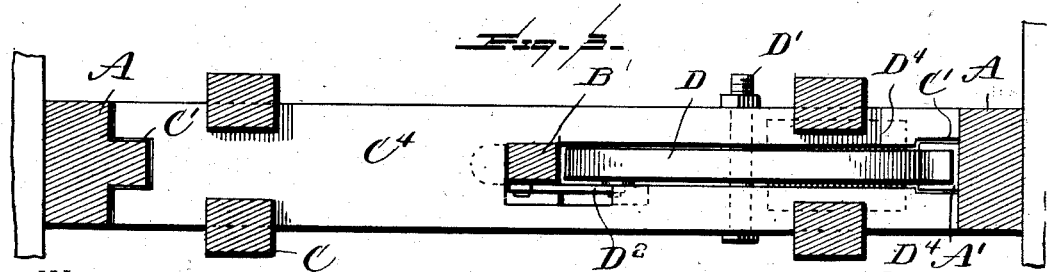
WITNESSES:
W. F. Doyle
Alfred T. Gage
INVENTOR
Elbert C. Edwards
BY E. B. Stocking
Attorney

UNITED STATES PATENT OFFICE.

ELBERT C. EDWARDS, OF EMPORIA, KANSAS.

ELEVATOR-STOP.

SPECIFICATION forming part of Letters Patent No. 706,644, dated August 12, 1902.

Application filed May 10, 1902. Serial No. 106,715. (No model.)

*To all whom it may concern:*

Be it known that I, ELBERT C. EDWARDS, a citizen of the United States, residing at Emporia, in the county of Lyons, State of Kansas, have invented certain new and useful Improvements in Elevator-Stops, of which the following is a specification, reference being had therein to the accompanying drawings.

This invention relates to a rotary elevator-stop, and particularly to a construction of rotary dog carried by a moving cage and adapted to engage a stationary rack.

The invention has for an object to provide a simple and economically-constructed rotary dog which may be balanced to move quickly and to positively engage a rack in the event of the breaking of a lifting-cable or the slacking thereof, so as to hold and firmly support the car.

A further object is to provide this dog with a stop-block adapted to have a firm bearing upon the frame in which the dog is mounted, so that the car or cage will be supported from this frame when the frame is engaged with the rack upon the side of the well.

Other and further objects and advantages of the invention will be hereinafter set forth and the novel features thereof specifically defined by the appended claims.

In the drawings, Figure 1 is a side elevation with the dog released from the rack and the cage supported by the lifting-cable; Fig. 2, a similar view showing the dog engaged with the rack and the cable broken, and Fig. 3 is an enlarged horizontal section through the frame supporting the dog.

Like letters of reference refer to like parts in the several figures of the drawings.

The letter A designates the guides supported by the side walls of an elevator-shaft, which may be of any ordinary construction and provided with a rack A' upon either one or both sides thereof, and when upon both sides the structure of dog herein shown is duplicated upon the opposite side. A cage or car $A^2$ of any suitable construction is adapted to travel upon these guides in the usual manner and is rigidly connected to a frame C by means of hangers B', suitably connected at one end to the upper portion of the car or cage.

For the purpose of supporting the rotary stop a frame C of any desired construction is provided and at opposite sides engaging flanges C' are formed to ride upon the guides A in the movement of the car $A^2$, while the rod B passes through this frame and is provided above the same with a supporting face or head $C^2$, by which the weight of the car $A^2$ will be supported when the lifting-cable is broken or slackened. This head rests upon the upper face of the cross-bar $C^3$, and below this face a stop $B^2$ is provided upon the rod B, with a coiled spring $B^3$ extending between the stop and the under face of the cross-bar $C^3$ for the purpose of quickly projecting the rod B downward through the frame to actuate the rotary dog D, mounted therein. This dog D consists of a disk centrally pivoted at D' within the lower cross-piece $C^4$ of the frame C and is operatively connected with the rod B by means of a link $D^2$, pivotally connected at its opposite ends to the dog and rod, whereby the movement of the rod rotates the dog upon its pivot to throw the point $D^3$ thereof into or out of the path of the rack A'. This dog is provided beneath its pivot and upon one or both sides with a stop-block $D^4$, rigidly connected to the dog and adapted to engage the under face of the lower cross-bar $C^4$, so that the supporting strain against further rotation is removed from the other parts, which are liable to be broken, and carried by the stronger cross-bar $C^4$ by the engagement of the stop-blocks therewith. For the purpose of guiding the travel of the rod B without twisting or rotation this rod is shown of angular formation passing through sockets of similar configuration. In the operation of the invention it will be seen that when the car is supported by the frame the upward tension upon the rod connecting the cable holds the dog out of engagement with the rack and places the spring under tension, while the frame carrying the dog freely travels upon the guides in the movement of the car. In the event of breakage of the lifting-cable or sudden slack thereof the spring $B^3$ and the weight of the rod shift the rotary dog, so as to bring the point thereof into the path of the rack, engaging a tooth to stop and hold the frame C in engagement with the rack and support the car by means of hangers B', carried by the frame for the connecting-rod B, while the stop-blocks $D^4$ relieve the other parts from the strain, which is thereby transmitted to the under side of the frame. It will be noted that the circular form of the rotary dog balances the same, so that it can be easily and freely moved when necessary. It will be obvious that while the dog is shown as supported by a frame above the car it may be supported upon a side of the car or in any position found desirable.

It is apparent that changes may be made in the construction and configuration of the invention without departing from the spirit thereof as defined by the appended claims.

Having described my invention and set forth its merits, what I claim, and desire to secure by Letters Patent, is—

1. In an elevator-stop, a frame comprising parallel members, a reciprocating supporting-rod, a lifting-cable connected thereto, a fixed rack, a dog pivoted between said members and provided with a lateral projection to engage said frame in one position, and a connecting-link pivoted at opposite ends to said rod and to said dog; substantially as specified.

2. In an elevator-stop, a reciprocating supporting-rod, a lifting-cable connected thereto, a fixed rack, a dog pivoted to engage said rack in one position, a connecting-link extending from said rod to said dog, a sliding frame in which said dog is mounted, and a stop-block carried by said dog to engage said frame; substantially as specified.

3. In an elevator-stop, a reciprocating supporting-rod, a lifting-cable connected thereto, a fixed rack, a dog pivoted to engage said rack in one position, a connecting-link extending from said rod to said dog, a sliding frame in which said dog is mounted, a stop-block carried by said dog to engage said frame, a collar supported by said rod, and a spring extending between said frame and collar; substantially as specified.

4. In an elevator-stop, a sliding frame, a rotary dog mounted therein, a rack at one side of said frame, a peripheral point carried by said dog to engage said rack, a stop-block carried by said dog to engage said frame, and means for rotating said dog upon its pivot; substantially as specified.

5. In an elevator-stop, a sliding frame, a rotary dog mounted therein, a rack at one side of said frame, a peripheral point carried by said dog to engage said rack, a stop-block carried by said dog to engage said frame, a car beneath said frame, a lifting-cable, a rod passing through said frame and connecting said cable and dog, and a supporting-head upon said rod; substantially as specified.

In testimony whereof I affix my signature in presence of two witnesses.

ELBERT C. EDWARDS.

Witnesses:
W. W. JONES,
F. P. WARREN.